*(12)* United States Patent
Golitschek et al.

US007002923B2

(10) Patent No.: US 7,002,923 B2
(45) Date of Patent: Feb. 21, 2006

(54) CHANNEL QUALITY MEASUREMENT IN DATA TRANSMISSION USING HYBRID ARQ (75) Inventors: Alexander Golitschek, Langen (DE); Eiko Seidel, Langen (DE)

(73) Assignee: Matsushita Electric Industrial Co., Ltd., Osaka (JP)

( * ) Notice: Subject to any disclaimer, the term of this patent is extended or adjusted under 35 U.S.C. 154(b) by 399 days.

(21) Appl. No.: 10/221,444

(22) PCT Filed: Jan. 17, 2001

(86) PCT No.: PCT/EP01/00500

§ 371 (c)(1),
(2), (4) Date: Dec. 6, 2002

(87) PCT Pub. No.: WO02/058314

PCT Pub. Date: Jul. 25, 2002

(65) Prior Publication Data

US 2003/0185175 A1 Oct. 2, 2003

(51) Int. Cl.
*G01R 31/08* (2006.01)
(52) U.S. Cl. .................... 370/253; 370/349; 714/749
(58) Field of Classification Search ............ 370/252, 370/253, 345, 349, 328, 473, 335, 342, 465; 714/746, 748, 749, 750, 751, 752
See application file for complete search history.

(56) References Cited

U.S. PATENT DOCUMENTS

| 5,425,051 A | | 6/1995 | Mahany | |
|---|---|---|---|---|
| 5,629,948 A | * | 5/1997 | Hagiwara et al. .......... | 714/748 |
| 5,781,542 A | | 7/1998 | Tanaka et al. | |
| 5,940,769 A | * | 8/1999 | Nakajima et al. .......... | 455/509 |
| 6,167,273 A | * | 12/2000 | Mandyam .................. | 455/450 |
| 6,266,360 B1 | * | 7/2001 | Okamoto .................... | 375/140 |
| 6,608,818 B1 | * | 8/2003 | Abrol et al. ................ | 370/252 |
| 6,615,382 B1 | * | 9/2003 | Kang et al. ................ | 714/748 |
| 6,704,898 B1 | * | 3/2004 | Furuskar et al. ........... | 714/751 |

FOREIGN PATENT DOCUMENTS

| JP | 2000224226 | 8/2000 |
|---|---|---|
| WO | 0072496 | 11/2000 |

OTHER PUBLICATIONS

Japanese Office Action dated Apr. 20, 2004 with English translation.
International Search Report dated Sep. 26, 2001.
Bakhtiyari S et al., "Practical Implementation of a Mobile Data Link Protocol with a Type II Hybrid ARQ Scheme and Code Combining", Personal Communication—Freedom Through Wireless Technology, Secaucus, NJ, Proceedings of the Vehicular Technology Conference, New York, IEEE, US, vol. 43, ppgs 774-777, May 18, 1993.

* cited by examiner

*Primary Examiner*—Bob A. Phunkulh
(74) *Attorney, Agent, or Firm*—Stevens, Davis, Miller & Mosher, LLP (57) ABSTRACT

A hybrid ARQ technique for transmitting a data unit on a radio channel in a communication system to a receiver is provided, wherein after the encoding the data unit into a sequence of code words using an encoding parameter, a first code word is transmitted, and an ACK or NAK is received from the receiver. If a NAK is received, the next code word of the sequence is transmitted. A measurement value indicating the current channel conditions is determined by counting the NAK messages and/or evaluating the encoding parameters. The measurement values may be the overall coding rate, the average number of retransmissions per data unit, or the average number of retransmissions per code word. The transmitter may include a NAK counter. The measurement may be used for adaptation purposes.

27 Claims, 9 Drawing Sheets

CHANNEL QUALITY MEASUREMENT IN DATA TRANSMISSION USING HYBRID ARQ

FIELD OF THE INVENTION

The invention relates to a hybrid ARQ technique for data transmission and in particular to a hybrid ARQ Type II/III method of operating a transmitter for transmitting a data unit on a radio channel in a communication system to a receiver. The invention further relates to a corresponding transmitter and communication system. The invention can be applied in mobile communication systems and is particularly applicable to cellular systems. In particular, the invention can be applied in the Universal Mobile Telecommunication System UMTS.

BACKGROUND OF THE INVENTION

Figure 1:
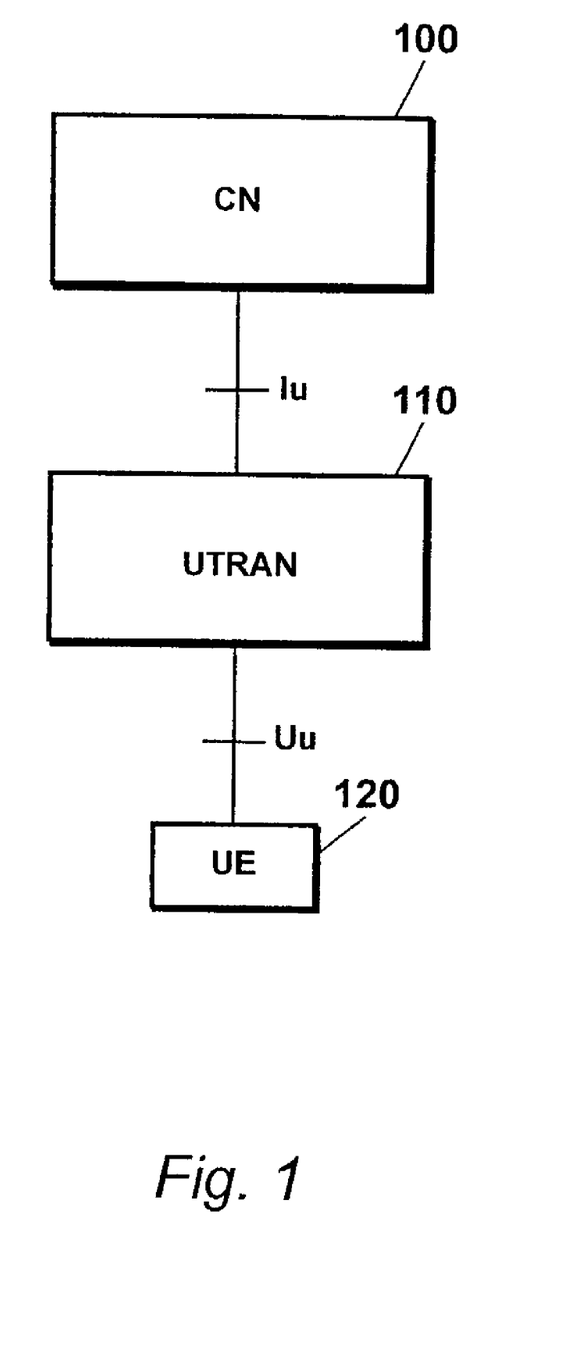
FIG. 1 illustrates the UMTS architecture.

UMTS is one of the candidate technologies for next generation mobile communication systems, and its architecture is depicted in FIG. 1. UMTS is composed of a Core Network CN 100 which is connected with interface Iu to the radio access network UTRAN 110 (UMTS Terrestrial Radio Access Network). The UTRAN 110 is on the other side connected to the User Equipment UE 120 with interface Uu.

Figure 2:
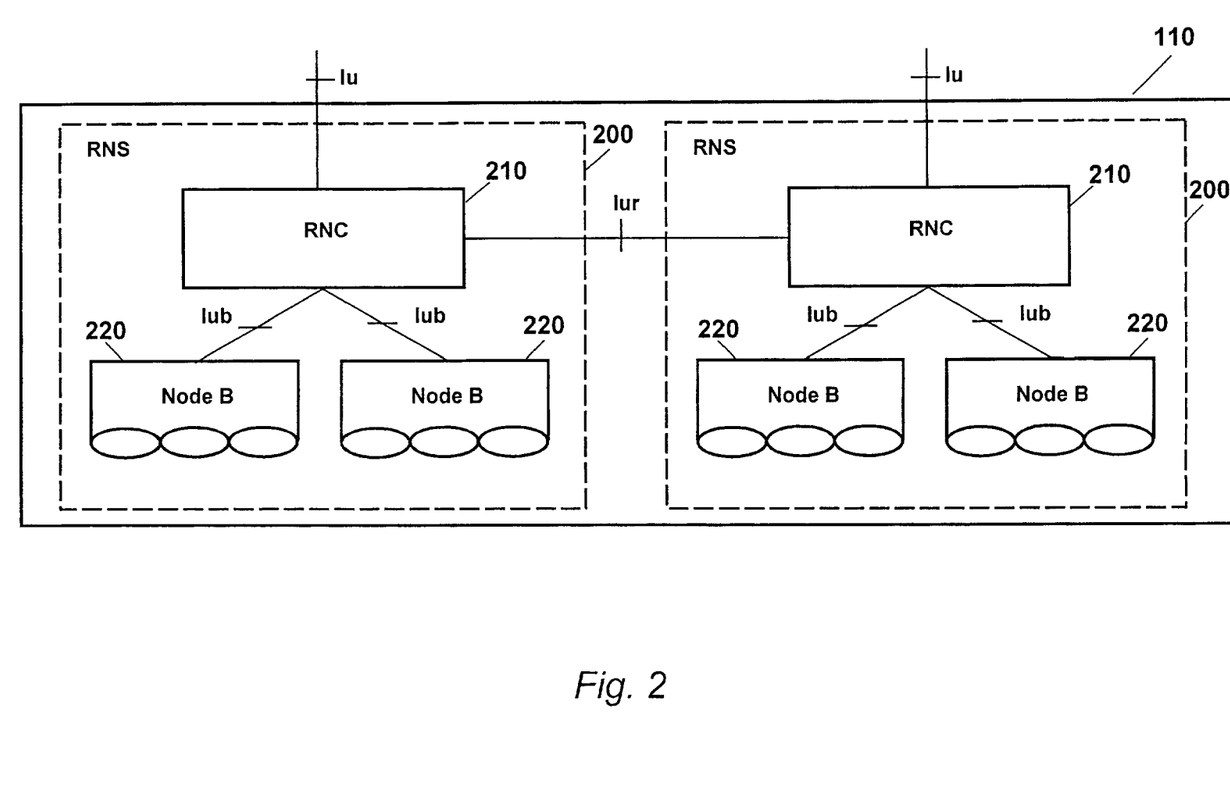
FIG. 2 illustrates the UTRAN architecture.

As can be seen from FIG. 2, the UTRAN 110 consists of a set of Radio Network Subsystems RNS 200 connected to the Core Network CN 100 through the interface Iu. Each RNS 200 consists of a Radio Network Controller RNC 210 which is responsible for the Handover decisions that require signalling to the User Equipment UE 120. Further, the Radio Network Subsystems RNS 200 comprise base stations (Node Bs) 220 which are connected to the Radio Network Controller RNC 210 through an interface Iub. Inside the UTRAN 110, the Radio Network Controllers RNC 210 of the Radio Networks Subsystems RNS 200 can be interconnected via a further interface Iur. The interfaces Iu and Iur are logical interfaces. Iur can be conveyed over a direct physical connection between the Radio Network Controllers RNC 210 or virtual networks using any suitable transport network.

The control plane signalling of Layer 3 between the User Equipment UE 120 and the UTRAN 110 is handled by the Radio Resource Control RRC layer. Besides others as conveying broadcast information, establishing radio bearer, controlling radio resources, the RRC is also responsible for User Equipment UE measurement reporting and control of the reporting. The measurements performed by the User Equipment UE 120 are controlled by the RRC layer in terms of what to measure, when to measure and how to report, including both UMTS air interface and other systems. The RRC layer also performs the reporting of the measurements from the User Equipment UE 120 to the network.

In data communications systems, error detection incorporated with Automatic Repeat reQuest (ARQ) is widely used for error control. The most common technique for error detection of non-real time services is based on hybrid ARQ schemes which are a combination of ARQ and Forward Error Correction (FEC).

FEC introduces redundancy into a block of information bits of length k to form a coded block of length n, before transmission. The redundancy helps to combat errors at the receiver.

Figure 3:
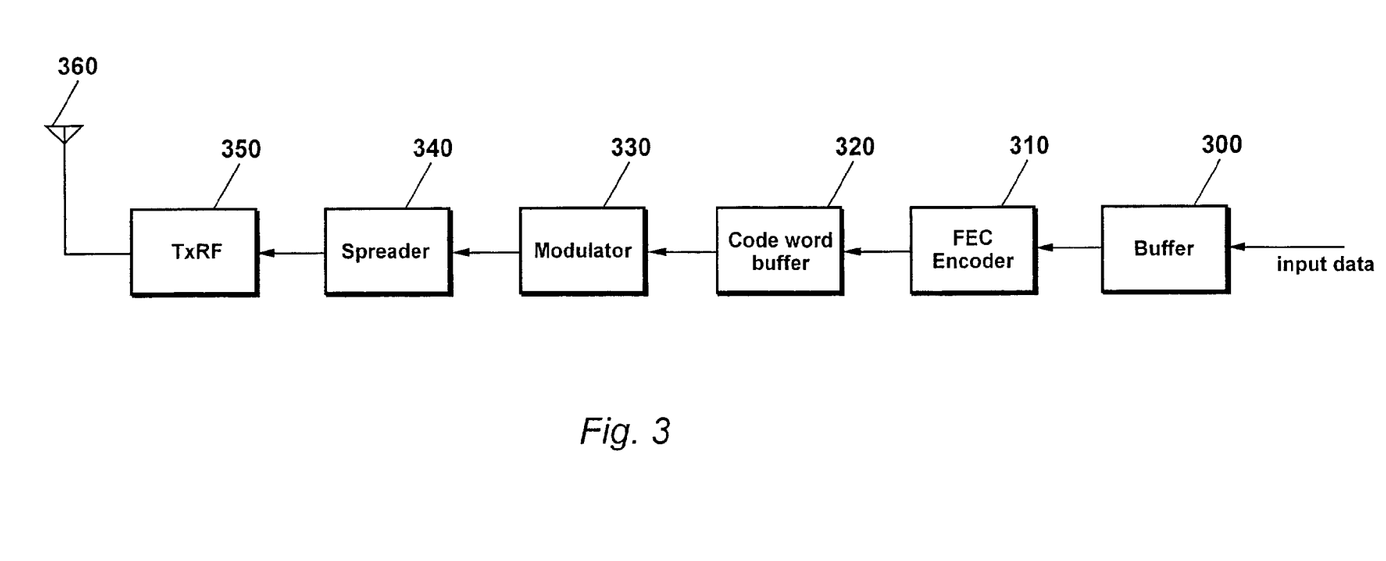
FIG. 3 is a block diagram illustrating a transmitter capable of FEC encoding the data to be transmitted.

A transmitter which performs forward error correction is depicted in more detail in FIG. 3. The input data which are to be transmitted are first buffered in buffer 300. When there is data in the buffer 300 and the transmitter is assigned a physical channel for transmission, the data is encoded in the FEC encoder 310 thereby generating a mother code. The mother code or all the code words (code segments) of the mother code are then forwarded to the modulator 330 and the spreader 340 (in case of a Code Division Multiple Access CDMA system), shifted to the radio frequency RF by the RF circuit 350 and transmitted via the antenna 360. If Type II/III ARQ (described below) is used the transmitter further comprises a code word buffer 320 since different code words are sent in the retransmissions.

Turning now to the ARQ technique, the most frequently schemes used in mobile communications are the stop-and-wait (SAW) and selective-repeat (SR) continuous ARQ schemes. If an error is detected by Cyclic Redundancy Check (CRC), the receiver requests the transmitter to send additional bits. A retransmission unit of the Radio Link Control RLC layer is referred to as protocol data unit PDU.

Figure 4:
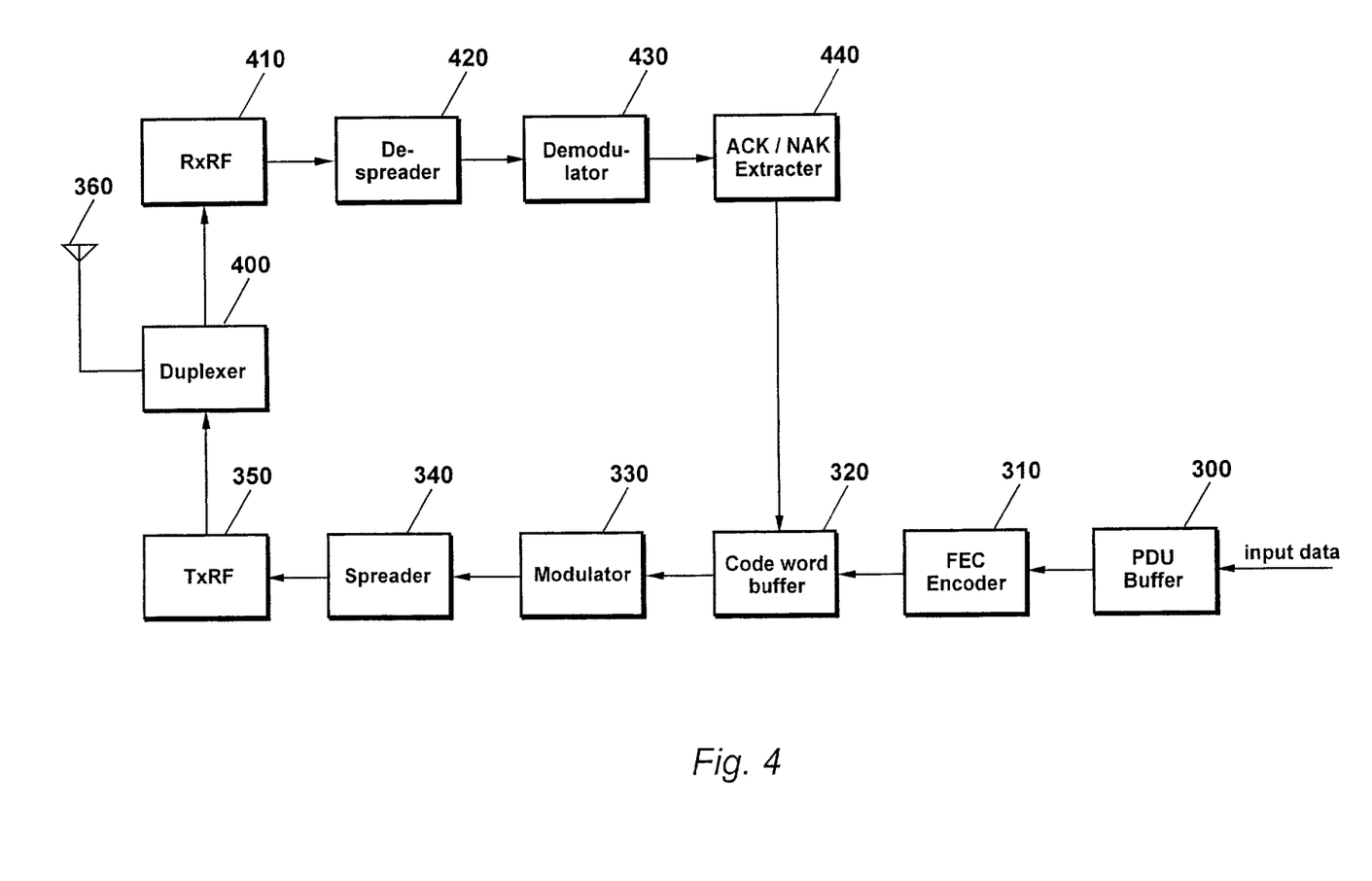
FIG. 4 is a block diagram illustrating a transmitter adapted to the FEC/ARQ scheme.

A transmitter arranged for being operated according to ARQ schemes is depicted in FIG. 4. Since the transmitter has to be able to receive requests from the receiver, the transmitter comprises a duplexer 400 which allows for using one antenna 360 for transmission and reception. When the transmitter receives a signal, it shifts the signal with the RF circuit 410 into the base band, despreads the signal in the despreader 420, forwards the despread signal to the demodulator 430, and extracts an ACK/NAK signal from the demodulated data. An ACK message informs the transmitter that the receiver was able to successfully decode the transmitted PDU. A NAK message informs the transmitter of a decoding error. Depending on whether the transmitter receives an ACK or a NAK, the ACK/NAK extractor 440 accesses the code word buffer 320 for retransmission purposes or will release the memory if an ACK has been received.

Figure 5:
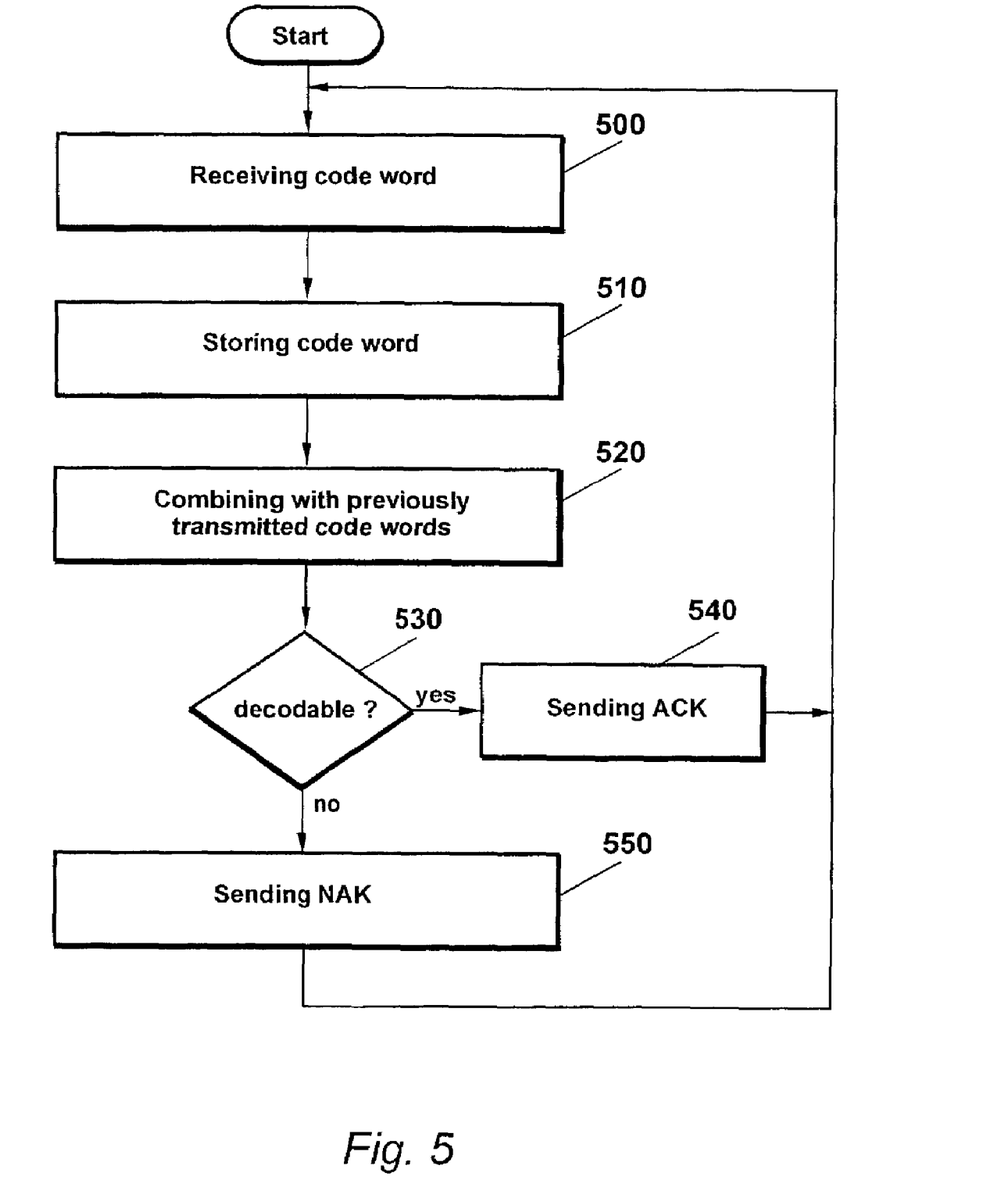
FIG. 5 is a flowchart illustrating the operation of a receiver working according to the ARQ technique.

Referring now to FIG. 5, the flow chart illustrates in more detail the process performed by the receiver. In step 500 the receiver receives a code word which is then stored in step 510. When code words have been previously transmitted, the received and stored code word may be combined with a previously transmitted code word of the same data unit, in step 520. It is then decided in step 530 whether the PDU can successfully be decoded. If so, a positive acknowledge message ACK is sent back to the transmitter and all the stored code words of that PDU are released (step 540). Otherwise, a negative acknowledgement message NAK is sent (step 550) to request a retransmission.

Depending on the bits that are retransmitted, three different types of ARQ can be distinguished:

Type I: The erroneous PDU's are discarded and a new copy of the PDU is retransmitted and decoded separately. There is no combining of earlier and later versions of that PDU.

Type II: The erroneous PDU that needs to be retransmitted is not discarded, but is combined with some incremental redundancy bits provided by the transmitter for subsequent decoding. Retransmitted PDU's sometimes have higher coding rates and are combined at the receiver with the stored values. Thus, only little redundancy is added in each retransmission.

Type III: This ARQ type differs from Type-II ARQ only in that every retransmitted PDU is now self decodable. This implies that the PDU is decodable even without forming the combination with previous PDU's. This is useful if some PDU's are so heavily damaged that almost no information is reusable.

The schemes II and III are more intelligent and show some performance gain because they have the ability to adjust the coding rate to changing radio environments and to reuse redundancy of previously transmitted PDU's. Such Type II/III ARQ schemes are in the following referred to as "incremental redundancy". The separate versions of the PDU's are encoded differently in the physical layer to increase the coding gain for the combining process. These different portions of the overall code will be called code blocks or code words.

As the ARQ schemes II and III put severe requirements on the memory size to store the soft decision values for subsequent combining, it has been proposed to introduce a very fast feedback channel. The feedback channel is used for sending the ACK and NAK information from the receiver to the transmitter. Usually, there is some round trip delay involved until an ACK or a NAK can be sent because this information is gathered in status reports. It has therefore been seen beneficial to send the feedback very fast by the physical layer directly without an involvement of higher layers such as Radio Link Control RLC. If a NAK has been received, the transmitter can send the next code block with a minimum delay. Thus the number of code blocks that have to be stored are kept very small and the overall delay is decreased.

Because of the limited spectrum resources, future mobile communication systems will be adaptive to the radio environment. The transmission parameters such as modulation, data rate, spreading factor, and the number of spreading codes will be based on the current channel conditions.

However, in Frequency Division Duplex FDD systems the transmitter usually have only little knowledge of the channel conditions experienced by the receiver. If there is some traffic from the receiver to the transmitter on the reverse link, measurements on this traffic will not be reliable since they are made on a different frequency. There are also measurements that can be made in the transmitter. One of such measurements e.g. for the node B is the transmitted code power which corresponds to the transmitted power to a certain User Equipment UE 120. Since the transmit power is controlled by UE power control commands, it follows the channel conditions and tries to compensate for channel attenuation such as pathloss and fading. Nevertheless, such transmitter measurements might not be meaningful under certain conditions.

Prior art adaptation techniques are often based on measurement reports that have to be sent from the receiver to the transmitter. Radio Resource Control RRC can configure such kind of measurements that will then be reported from the UE 120 to the Radio Network Controller RNC 210. These measurement reports introduce additional signalling overhead that has to be transmitted over the air. A continuous measurement reporting is therefore disadvantageous for adaptation purposes since it introduces too much interference on the reverse link. On the other side, if reporting is not done continuously there will be a delay at the transmitter so that adaptation cannot be performed accurately according to the present channel conditions.

Another prior art adaptation technique in simple ARQ systems is based on ACK/NAK transmissions which are already available in the transmitter. If a high number of NAK messages are received, the transmitter can for instance reduce the code rate. In systems using incremental redundancy this is however disadvantageous because hybrid ARQ Type II/III inherently involves a high number of retransmissions, i.e. a high number of NAK messages.

While incremental redundancy can already be considered as an adaptive coding scheme there is still a need for further adaptation. In the following one example is given why further adaptation is still needed.

For mobile communication systems which do not use incremental redundancy, the coding rate is usually around ½ and ⅓. Type II/III schemes use lower code rates for the first code block. Prior art systems for incremental redundancy are using a fixed coding rate for each code block. For instance, each code block could have a fixed code rate of 1. Assuming no acknowledgement, the overall coding rate (after subsequent combining) will decrease with each retransmission to r=1, ½, ⅓, ¼ and so on.

Thus, compared to Type I ARQ; incremental redundancy schemes have more retransmissions because the redundancy added per code block (with each retransmission) is smaller in Type II/III schemes. For a good adaptation granularity (coding rate to the channel condition) the code rate of a single code block should be high. The number of retransmissions will increase but the overall code rate will be nearer the optimum coding value at this particular moment.

There are several problems that come up with such design criteria:

First of all the number of retransmissions that have to be requested over the feedback channel is large and leads to an increase of the signalling overhead on the feedback channel. Further, the delay until a whole PDU is successfully decoded increases by the round trip delay RTD time with each retransmission. Furthermore, the memory requirements increase with the number of retransmissions that are proportional to the time needed for storing single code blocks. Moreover, if a high code rate is assumed for the first code block, e.g. r=1, there will be near 100% retransmission in bad channel conditions because this data rate is designed for good channel conditions. On the other hand, if a low code rate is assumed for the first code block, e.g. r=½, there will be fewer retransmissions, but the gain will be relatively small compared to hybrid Type I ARQ.

Besides incremental redundancy, there are other known techniques of adaptive coding. However, these prior art adaptive coding schemes do not consider the behaviour of the ARQ Type II/III scheme where the code can be split into multiple code blocks. Since there will be a gain from the time diversity of the multiple code blocks the required coding rate for hybrid ARQ Type I scheme will be different from hybrid ARQ Type II/III schemes.

SUMMARY OF THE INVENTION

In order to overcome the above discussed drawbacks of the prior art systems, it is the object of the invention to provide a hybrid ARQ techniques allowing for additional measurements in the transmitter without the need of signalling measurement reports on the reverse link, thereby reducing the overhead.

This object is solved by the invention as claimed in the independent claims.

The invention is advantageous in that it provides an adaptive coding scheme with incremental redundancy, making use of information that is already available at the transmitter. Thus, the invention provides a transmitter measurement overcoming the numerous drawbacks of the prior art schemes.

Preferred embodiments are defined in the dependent claims.

As mentioned above incremental redundancy schemes inherently receive ACK/NAK information on the feedback channel. As such, it is not very expressive since a high number of NAK messages have to be received for a good adaptation. In the preferred embodiments, the invention provides a technique to derive the overall code rate that was needed for the acknowledgement of previous PDUs. This information can be derived by summing up the number of retransmissions with the corresponding code rate of the corresponding PDUs. This allows for instance to determine an estimate of the required FEC parameter without the need for any additional measurement reports from the receiver to the transmitter.

Besides the new transmitter measurement, the present invention makes, in one embodiment, use of this measurement for adaptation. Depending on the channel conditions, the number of retransmissions needed for decoding the PDU's will vary. For incremental redundancy the performance gain compared to ARQ Type I is only large if there is a certain portion of NAK messages at the first transmission (e.g. larger than 50%). For good channel conditions a code rate near 1 (i.e. no redundancy) might be appropriate while in very bad situations (e.g. fading, shadowing) even code rates of ⅓ could allow only some packets to be decoded correctly.

The invention further provides an adaptive coding for the code rates of the separate code blocks. Particularly the code rate of the first code block can be tailored to deliver a certain target rate of retransmissions under several channel conditions.

The invention will now be described in more detail with reference to the accompanying drawings in which.

DETAILED DESCRIPTION OF EMBODIMENTS

The invention will now be described in more detail with reference to the accompanying drawings.

The code rate r is the ratio of the number of information bits k to the number of transmitted coded bits n. Different code rates and code words can easily be generated using rate compatible punctured codes such as RCPT and RCPC codes. The code words are punctured from a common mother code. The mother code should have a low coding rate to allow several high code rate code words to be generated from it. Either the PDU or the mother code needs to be stored in the transmitter for the case retransmissions are requested and new code words are needed to be sent. While it will be understood by those of ordinary skill in the art that the invention is not limited to the specific embodiments described hereafter, it will now be assumed that the whole mother code (i.e. all code words) is stored in the transmitter for retransmissions. This reduces the complexity for encoding but needs more memory in the transmitter.

Figure 6:
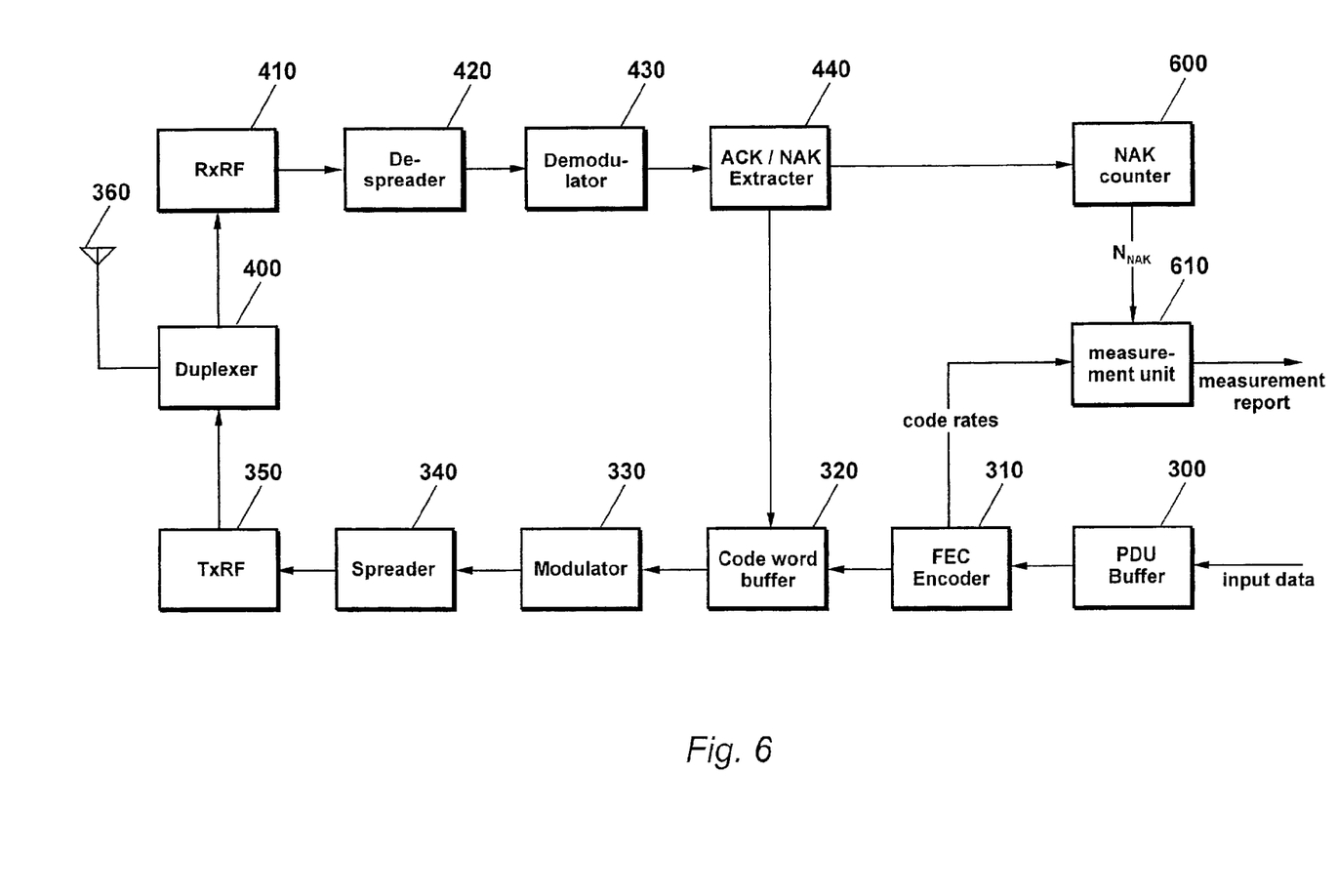
FIG. 6 is a block diagram illustrating a transmitter according to a first preferred embodiment of the present invention.

Referring now to FIG. 6 which illustrates a first preferred embodiment of a transmitter according to the present invention, the arrangement differs from that of FIG. 4 in that there is provided a NAK counter 600 and a measurement unit 610. The operation of the transmitter will now be explained in more detail with reference to FIG. 7.

Figure 7:
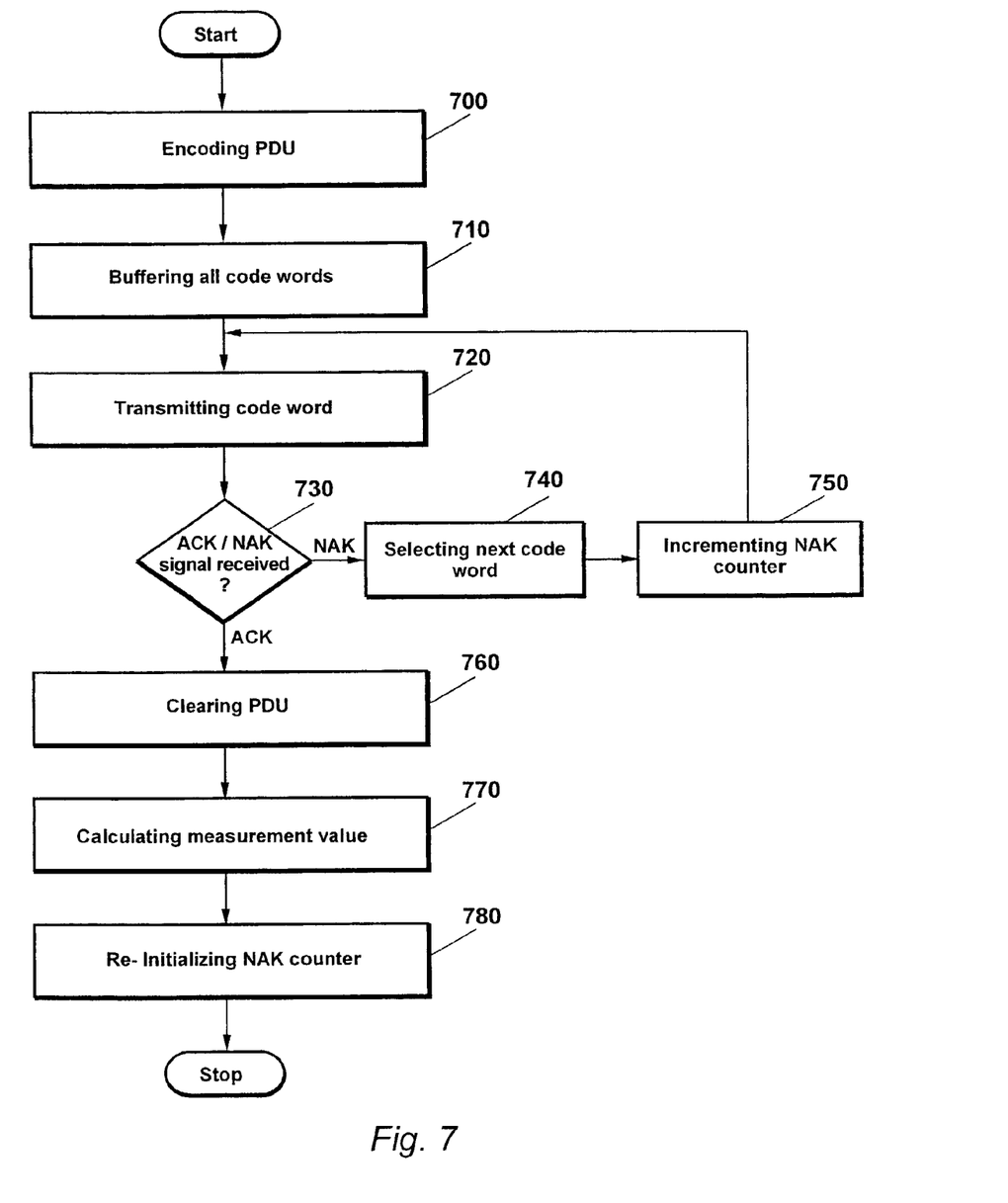
FIG. 7 is a flow chart illustrating the process of operating the transmitter according to FIG. 6.

After encoding the PDUs in steps 700 by the FEC encoder 310, the code words are buffered in the code word buffer 320 (step 710). Then, the first code word is transmitted in step 720. If the receiver is not able to decode the data, it will send a NAK message to request the transmitter to send the next new code to add more redundancy to the received data. In this case, the transmitter will receive in step 730 the NAK message and will select the next code word from code word buffer 320 in step 740. This next code word is then queued for transmission. After reception, the receiver will combine the new code word with the already received code word so that the overall code rate in the receiver is $r_{tot}=k/(n_{cw_1}+n_{cw_2})$. Thus, redundancy is added and it is more likely that the packet can be decoded.

If the transmitter receives in step 730 an ACK message, all the code words of the respective PDU can be cleared in step 760.

As shown in the flow chart, the NAK counter 600 is incremented in step 750 whenever a NAK message is received. Thus, the NAK counter 600 will count all NAK messages of a PDU until the PDU has been acknowledged. With the knowledge of the code rates of each code word the number $N_{NAK}$ of retransmission per PDU can be used in the measurement unit 610 to calculate the overall PDU code rate, the average number of retransmissions per PDU or the average number of retransmissions per code word. If the code rates of the code words are fixed the measurement unit 610 will preferably contain a memory for storing the code rates of each code word. As will be described in more detail below, the measurement can be averaged over a number of PDUs or over a certain time. For this purpose, the measurement 610 is preferably provided with a filter function. Averaging is preferably applied depending on the round trip delay until retransmissions can be sent and depending on how fast channel conditions change. In the filter function also a weighting could be applied in unit 610 to give the recent measurement more weight compared to previous measurements.

In the preferred embodiment, the measurement unit 610 reports the measurement value to higher layer units or other entities. Preferably, the measurement value is reported to the base station (Node B) 220 or to the Radio Network Controller RNC 210. Reporting can be done on demand, periodically or based on certain thresholds.

Examples of measurement values which can be calculated in step 770 by the transmitter based on the number of retransmissions without any additional measurements, will now be described in more detail. It will be appreciated that due to the inherent behaviour of hybrid ARQ Type II/III it is possible to derive the overall coding rate that was needed for successfully decoding the PDU's. Any adaptation to the radio environment can be based on such measurement values.

A first example of calculating a measurement value is to calculate the overall coding rate. For this purpose the transmitter counts the number $N_{NAK}$ of retransmissions per PDU and the coding rates $r_{cw_i}$ of each code block if this cannot be derived explicitly. The overall PDU coding rate $r_{tot}$ can now be calculated according to the following equation $$r_{tot} = \frac{k}{n_{cw_1} + n_{cw_2} + \ldots + n_{cw_{N_{NAK}}}} = \frac{k}{\sum_{i=1}^{N_{NAK}} n_{cw_i}} = \frac{1}{\sum_{i=1}^{N_{NAK}} \frac{1}{r_{cw_i}}}$$

where $n_{cw_i}$ is the number of coded bits of code word i. Depending on the accuracy and the time variance of the mobile channel, the code rate can be averaged $$\overline{r_{tot}} = \frac{1}{N_{PDU}} \cdot \sum_{i=1}^{N_{PDU}} r_{tot_i}$$

where $N_{PDU}$ is the number of packets used for averaging. In a preferred embodiment, the code rate of the first code block is adapted according to the average coding rate that has been used for previously transmitted PDU's.

Another example of calculating a measurement value is to calculate the average number of retransmissions per PDU. For each PDU, the number of retransmissions needed for successfully decoding is $N_{NAK_i}$. The average can then be calculated according to $$\overline{N_{NAK}} = \frac{1}{N_{PDU}} \cdot \sum_{i=1}^{N_{PDU}} N_{NAK_i}$$

This value is zero when there was no retransmission. In a preferred embodiment, the code rate of the first code block is adapted according to the number of retransmissions needed per PDU. Compared to ARQ Type I adaptive coding schemes the coding will not be adapted to have no retransmissions (i.e. $N_{NAK}=0$) but will ensure to receive a specified average number of retransmissions. Preferably, the average number is about 1 or even larger.

Yet another example of calculating a measurement value is to calculate the average number of transmissions per code word. The average number of retransmissions (equal to all NAK messages) per code word×averaged over $N_{PDU}$ can be calculated according to $$\overline{N_{NAKcwx}} = \frac{1}{N_{PDU}} \cdot \sum_{i=1}^{N_{PDU}} N_{NAKcwx_i}$$

Figure 8:
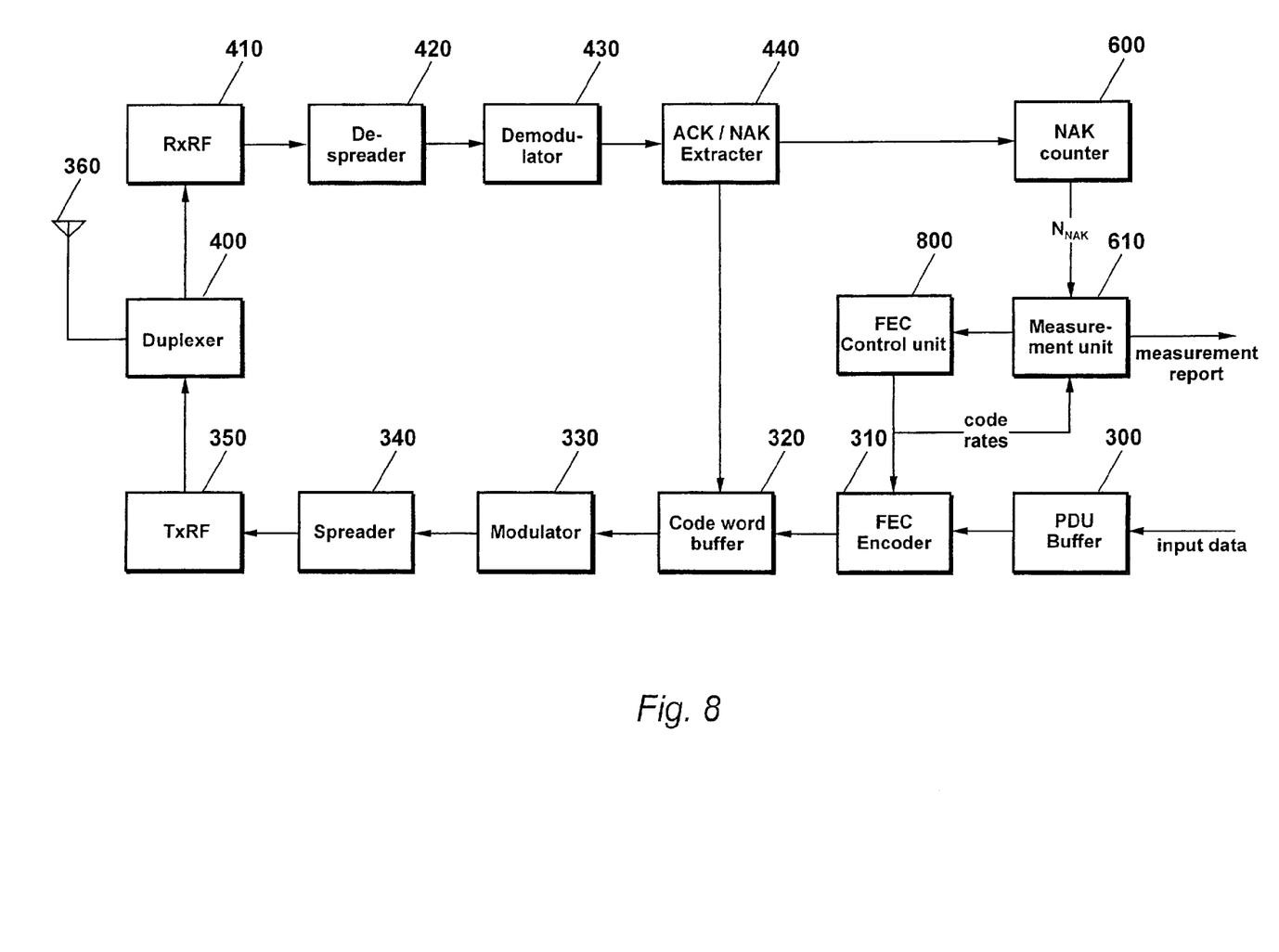
FIG. 8 is a block diagram illustrating a transmitter according to a second preferred embodiment of the present invention.

While in the above discussion the transmitter measurement of the present invention has been described in more detail, the following discussion will focus on using this measurement for adaptation purposes. Reference is made in this respect to FIG. 8 which differs from the arrangement of FIG. 6 by showing the FEC control unit 800. The transmitter of FIG. 8 performs adaptation of the FEC parameter used for encoding the data in the FEC encoder 310.

In FIG. 8, the adaptation is carried out by the FEC control unit 800. Based on the measurement provided by the measurement unit 610, the FEC control unit 800 adapts the FEC parameter. Once adaptation is carried out, the new code rates for the code words are reported to the measurement unit 610. The process of performing the adaptation is illustrated in FIG. 9.

The initial FEC values which are determined in step 900, are preferably based on measurements that have been made before transmission. In another preferred embodiment, the initial parameters are set to high code rates. During transmission the FEC parameters will be adapted to the environment. For this purpose, certain parameters used as adaptation criteria have to be monitored. This can for instance be the number of overall retransmissions per PDU, the number of retransmissions per code word, or the overall code rate (see above). It will however be appreciated by those of ordinary skill in the art that the adaptation can also be based on any other parameter measured in the transmitter or received from the receiver.

Figure 9:
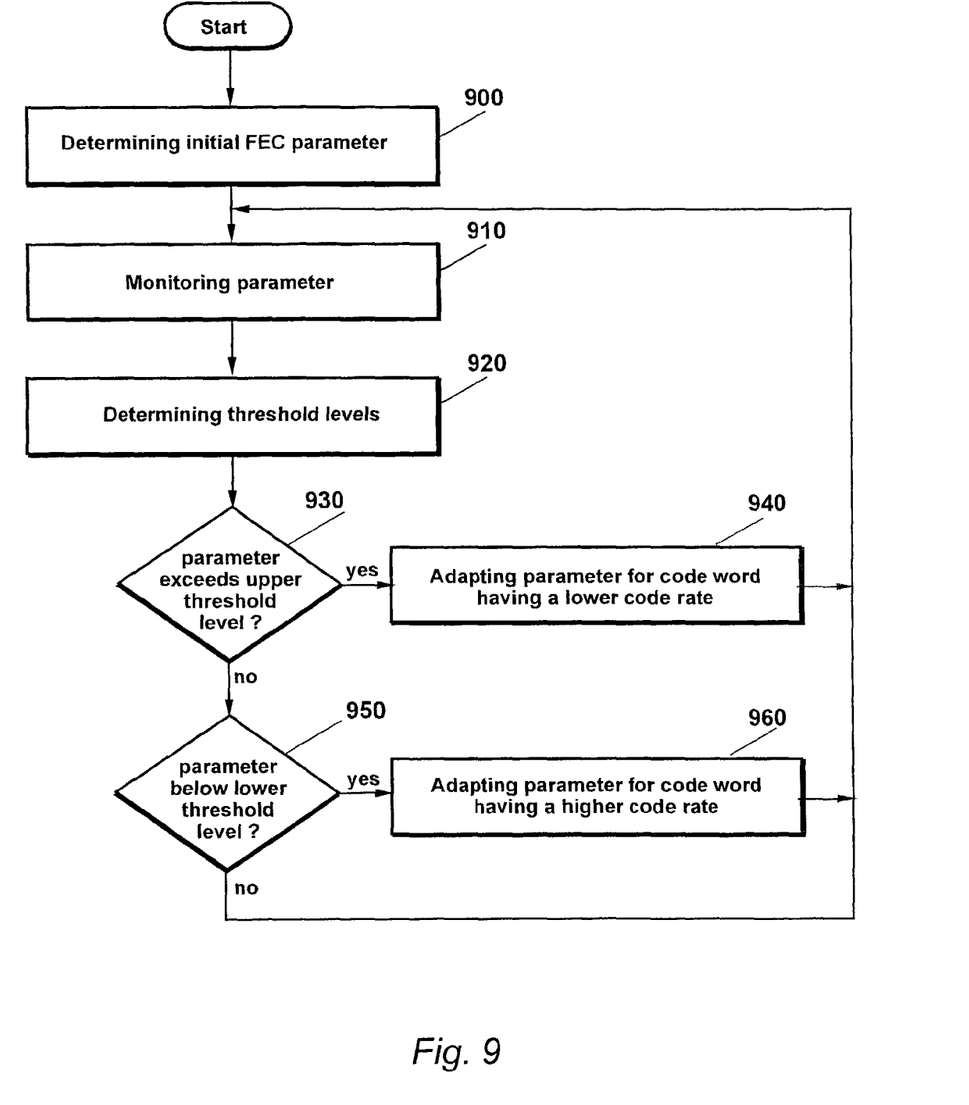
FIG. 9 is a flow chart illustrating the process of operating the transmitter according to FIG. 8.

In the adaptation process depicted in FIG. 9, thresholds are determined in step 920. Some variance can be included to avoid too frequent switching between different FEC parameter sets. The parameter monitored in step 910 is then compared to the threshold in steps 930 and 950. If the monitored parameter such as the average number of retransmission per code word is larger than the threshold, the code rate will be decreased. If on the other hand the monitored parameter is less than the threshold, the code rate will be increased.

In a preferred embodiment, the adaptation process is limited to some or only one of the code words. If only the first code word is adapted the code rate (or FEC parameter) of the following code words can be fixed to a higher coding rate. This ensures a small granularity of the overall code rate and the overall coding rate near the optimum. Alternatively, the code rate of the following code words can be explicitly derived from the coding rate of the first code block. This reduces the signalling overhead because the receiver can derive the coding rates of subsequent code blocks from the coding rates of the first code block.

In another preferred embodiment, the code rates of the code blocks are adapted to allow for decoding only a certain percentage of the PDU's per retransmission correctly. This percentage is preferably 25%.

Referring back to FIG. 8, instead of or in addition to the adaption of encoding parameters, in further preferred embodiments of the invention there will be a transmission parameter adapted. In one preferred embodiment, the modulation form is adapted. For this purpose, the control unit 800 has additional access (not shown in FIG. 8) to modulator 330. In another preferred embodiment, the adapted transmission parameter is the spreading factor or the number of spreading codes. Then, the control unit 800 has additional access (not shown in FIG. 8) to spreader 340.

What is claimed is:

1. A hybrid ARQ method for transmitting a data unit on a radio channel, the method comprising:
    encoding the data unit into at least a first code word and a second code word using at least one encoding parameter;
    transmitting said first code word using a transmitting parameter;
    receiving a positive (ACK) or negative (NAK) acknowledgement message from the receiver indicating that the data unit was transmitted successfully or not; and
    if a negative acknowledgement message was received, transmitting said second code word,
    wherein at least one of said encoding parameter and said transmitting parameter is based on a measurement value indicating the quality for the first code word.

2. The method of claim 1, wherein said measurement value is the number ($N_{NAKi}$) of negative acknowledgment messages received until a positive acknowledgment message is received.

3. The method of claim 1, wherein said measurement value is the overall coding rate ($r_{tot}$) determined from the coding rates ($r_{CWi}$) of each code word which has been transmitted until the positive acknowledgment message is received.

4. The method of claim 1 wherein said measurement value is the number ($N_{NAKCWXi}$) of negative acknowledgment messages per code word (x).

5. The method of claim 1 further comprising the step of averaging the measurement value over a number ($N_{PDU}$) of data units or applying a weighted 10 filter function giving less weight to previous data units.

6. The method of claim 1 wherein said at least one encoding parameter is a FEC code rate.

7. The method of claim 1 further comprising, adapting at least one encoding parameter to the measurement value.

8. The method of claims 1 further comprising, adapting a transmission parameter to the measurement value.

9. The method of claim 8 wherein said transmission parameter is the modulation form.

10. The method of claim 8 wherein said transmission parameter is the spreading factor.

11. The method of claim 8 wherein said transmission parameter is the number of spreading codes.

12. The method of claim 1 wherein said at least one encoding parameter is the code rate of the code words, and the method further comprises initializing the code rates to high values.

13. The method of claim 12 wherein said code rates of the code words following the first code word are derived from the code rate of the first code word.

14. The method of claim 12 further comprising signaling only the code rate of the first code word to the receiver.

15. A hybrid ARQ transmitter for transmitting a data unit on a radio channel, comprising:
- an encoder for encoding the data unit into at least a first code word and a second code word using at least one encoding parameter;
- a transmission unit for transmitting said first code word using a transmitting parameter;
- a receiving unit for receiving a positive (ACK) or negative (NAK) acknowledgement message from the receiver indicating that the data unit is transmitted successfully or not; and
- an operating unit that operates the transmission unit for transmitting said second code word if a negative acknowledgement message was received,
- wherein at least one of said encoding parameter and said transmitting parameter is based on a measurement value indicating the quality for the first code word.

16. The transmitter of claim 15 arranged for performing the method of claim 1.

17. The transmitter of claim 15, being a base station.

18. The transmitter of claim 17 further comprising means for sending the measurement value to a radio network controller on demand.

19. The transmitter of claim 17 further comprising means for sending the measurement value to a radio network controller periodically.

20. The transmitter of claim 17 further comprising means for sending the measurement value to a radio network controller event triggered.

21. A system comprising a transmitter according to claim 15 and a receiver.

22. The transmitter of claim 16, being a base station.

23. The transmitter of claim 18 further comprising means for sending the measurement value to a radio network controller periodically.

24. The transmitter of claim 22 further comprising means for sending the measurement value to a radio network controller on demand.

25. The transmitter of claim 22 further comprising means for sending the measurement value to a radio network controller event triggered.

26. The method of claim 1, wherein said measurement value is used to reach a target error rate.

27. The method of claim 1, wherein the first code word is different from the second code word with respect to the redundancy.

* * * * *